C. C. YOUNG.
OBSTETRICAL FORCEPS.
APPLICATION FILED MAY 14, 1908.
1,006,616.
Patented Oct. 24, 1911.
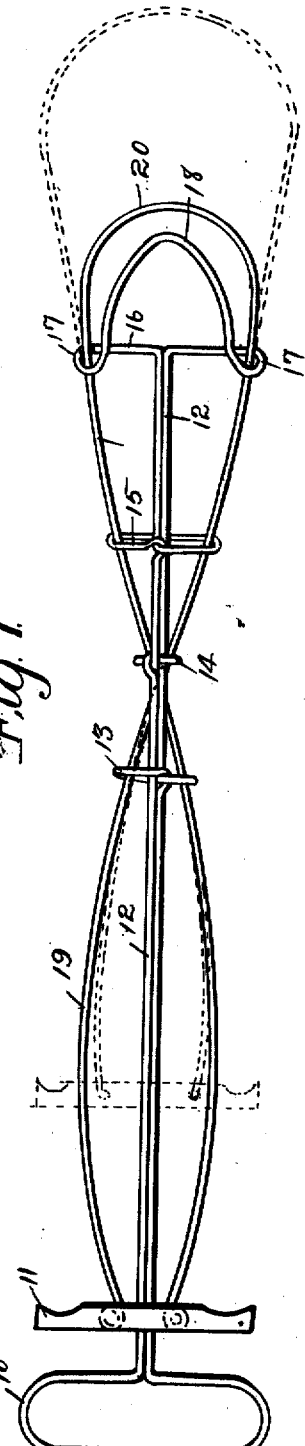
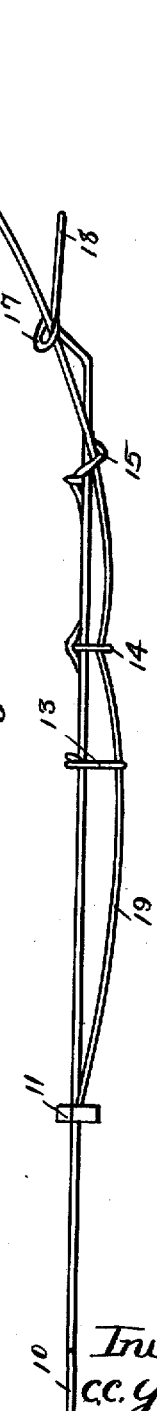
Witnesses
A. S. Hague.
F. C. Dahlberg.
Inventor
C. C. Young.
by Orwig & Lane attys

UNITED STATES PATENT OFFICE.

CHARLES C. YOUNG, OF DES MOINES, IOWA.

OBSTETRICAL FORCEPS.

1,006,616.  Specification of Letters Patent.  Patented Oct. 24, 1911.

Application filed May 14, 1908. Serial No. 432,953.

*To all whom it may concern:*

Be it known that I, CHARLES C. YOUNG, a citizen of the United States, residing at Des Moines, in the county of Polk and State of Iowa, have invented a new and useful Obstetrical Forceps, of which the following is a specification.

The object of my invention is to provide a forceps of this kind especially designed for use in connection with animals and so arranged that it may be readily and easily inserted in a closed position and when inserted it may be quickly and easily adjusted by means of the handle to open up and spread apart the two grasping members and at the same time spread apart the sides of one of the grasping members to thereby easily and conveniently encircle a small animal so that it may be grasped and removed.

The advantage of having the sides of one of the grasping members spread apart when the two grasping members are separated from each other, and again move together when the two grasping members are drawn toward each other enables the operator to easily and conveniently grasp the body portion of a small animal and remove it without danger of injury.

My invention consists in the construction, arrangement and combination of the various parts of the device, whereby the objects contemplated are attained, as hereinafter more fully set forth, pointed out in my claim, and illustrated in the accompanying drawings, in which—

Figure 1 shows a plan view of the complete forceps with the grasping members in their closed position, and Fig. 2 shows a side elevation of same with the grasping members open.

Referring to the accompanying drawings, I have used the reference numeral 10 to indicate the handle of the member that is hereinafter called the stationary member and the reference numeral 11 to indicate the handle of the member that is hereinafter called the movable member.

In use the operator grasps one handle in each hand and the instrument extends away from him. In certain portions of the operation for which the instrument is used the handle 10 is used while the other handle is held stationary, and at other portions of the operation the handle 11 is moved and the handle 10 held stationary, hence, the terms stationary portion and movable portion are used simply for convenience in description. For convenence in the description, I term the end that contains the handles the rear end and the end that contains the gripping members the forward end.

The stationary portion of the device is formed complete of a single piece of wire, which has at its rear end a handle 10. Extending forwardly from the handle 10 are two parallel wires 12, one of which has, near its central portion, a protecting and guiding loop 13, which extends laterally in both directions from the wires 12 and downwardly. A short distance in front of the loop 13 is a small guide loop 14 formed in one of the wires 12. A short distance in front of the loop 14 is a second combined protecting and guiding loop 15 which extends laterally in both directions and downwardly. A short distance beyond the loop 15 is a cross-head 16 formed in both of the wires 12, and each provided with a guide loop 17 at its outer end which guide loop is spaced apart from the adjacent wire 12 slightly farther than the outer limit of the guide loop 15. Beyond the loops 17 the wire is formed into a grasping member 18 which extends forwardly and downwardly from the loops 17 and is rounded at its forward end.

The part referred to as the movable member comprises the handle 11 which is slidingly mounted upon the wires 12 and which has fixed thereto on opposite sides of its central portion, the ends of a single piece of spring wire 19, the said wire members 19 extend through all of the loops before described and cross each other between the loops 14 and 13 as clearly shown in Fig. 1 of the drawings. These wires 19 extend below the wires 12 between the loop 15 and the handle 11 and then extend upwardly on a gradual curve until they pass through and beyond the loop 17, and the forward end of the wires 19 is rounded at 20 in semicircular form and is extended straight forwardly approximately parallel with the wires 12 as clearly shown in Fig. 2 of the drawings. Said parts are so arranged that when the handles 10 and 11 are adjacent to each other as shown in Fig. 1, the grasping member 18 and the grasping member 20 are close to each other and substantially parallel so that they may be easily inserted. When the handle 11 is moved away from the handle 10, the guide loops 14 and 17 will cause the wires 19 adjacent to the part 20 to spread as shown by dotted lines in Fig. 1, and it will also project the grasping member 20 in front of the grasping member 18.

In practical use and assuming that the handles 10 and 11 are close together as shown in Fig. 1, then obviously the forceps may be readily and easily inserted. When the operator feels that the grasping members have touched the small animal to be grasped, he then forces the handle 11 forwardly. This causes the grasping member 20 to move upwardly and inwardly over the small animal to be grasped and it also causes the sides to spread to thereby encircle the animal to be grasped. Then the operator moves the handle 10 forwardly and holds the handle 11 stationary. This has the effect of forcing the grasping member 18 under the small animal to be grasped and of drawing the sides 19 toward each other, and also of drawing the gripping members 18 and 20 toward each other. This is continued until the gripping members firmly grasp the small animal, whereupon the instrument may be bodily removed and the small animal brought out with it.

One of the advantageous results obtained by the use of my improved forceps, is that by crossing the wires 19 and providing the guide loops 17, the sides of the movable member will spread apart and thereby make the loop at the outer end of the movable gripping member of larger diameter; and another desirable result is that by providing the protecting and guiding loops 13 and 15, the crossed wires that enter the loop 14 are thereby prevented from engaging loose or soft particles of flesh when the handles 10 and 11 are moved toward each other.

I claim as my invention.

An improved obstetrical forceps, comprising a handle member formed of a single piece of wire doubled at its central portion and having a handle formed at one end, a guide loop near its center extending downwardly, a cross head at its outer end, a guide loop at each end of said cross head extending upwardly above the level of the central portion of said handle member, and a grasping member extending forwardly from the latter guide loops, and a second member formed of a single piece of spring wire, doubled at its central portion, a handle attached to one end thereof, the sides of said second member being curved outwardly and downwardly from said handle to a point midway between said handle and the central guide loop, then being curved upwardly and inwardly until said sides are crossed and etxended through said central guide loop, then being curved outwardly and upwardly and being extended through and beyond said end guide loops to form a grasping member, the outer portion of said grasping member being arranged substantially parallel with the grasping portion of the handle member, said parts being so arranged that when the handle of the spring wire member is moved away from the handle of the first member the grasping portion of the spring wire member will be moved both upwardly and forwardly and at the same time be expanded to form a large loop, said first member being also provided on opposite sides of the said central guide loop with laterally projecting loops designed to encircle the sides of the spring wire member and to coact with them in guiding said sides, and also to serve as guards to prevent substances from entering between the sides of the spring wire member and the body portion of the first mentioned member near the said central loop.

CHARLES C. YOUNG.

Witnesses:
RALPH ORWIG,
N. M. TAYLOR.

---

Copies of this patent may be obtained for five cents each, by addressing the "Commissioner of Patents, Washington, D. C."